UNITED STATES PATENT OFFICE.

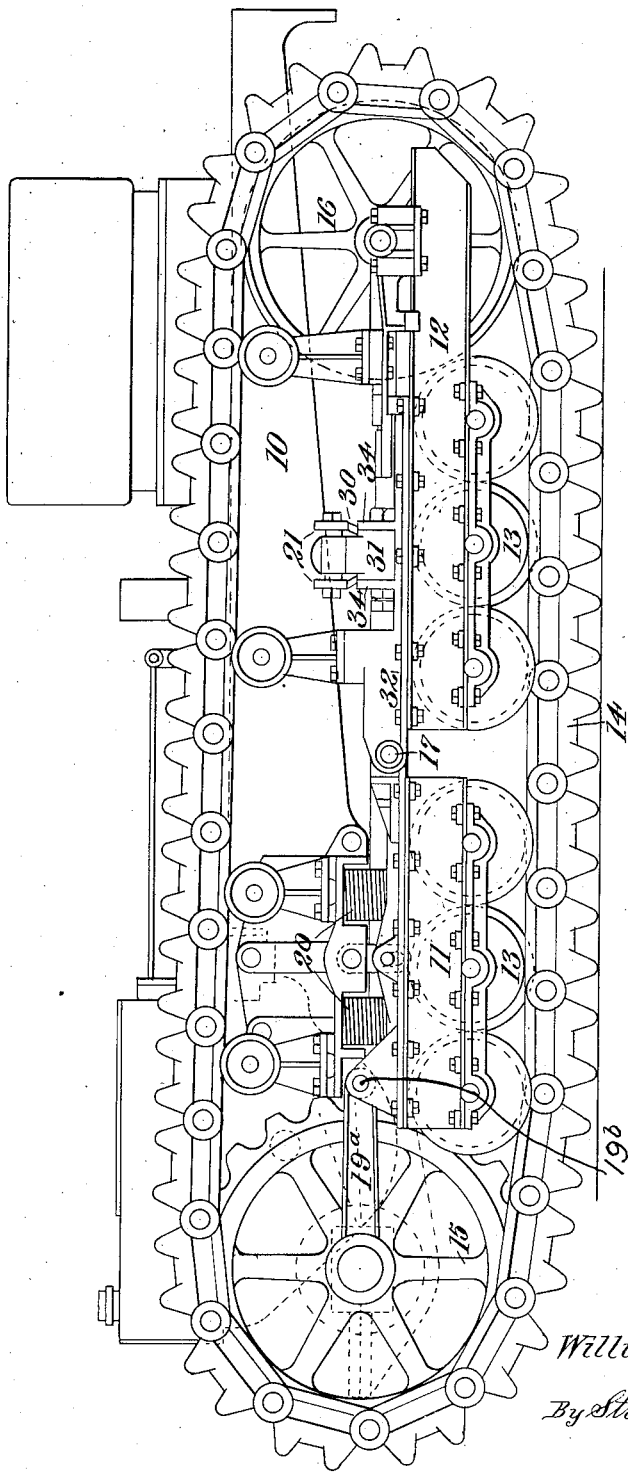

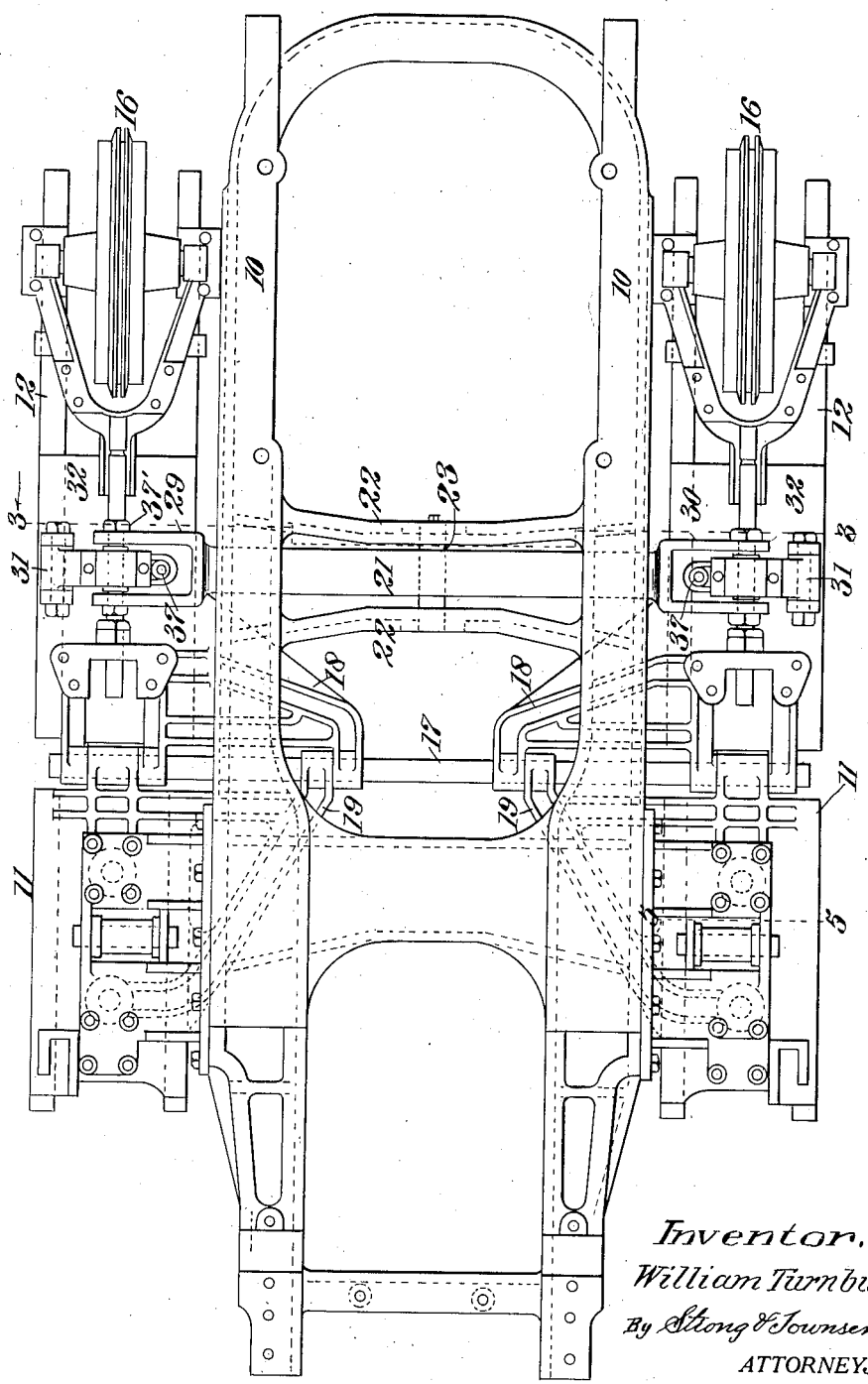

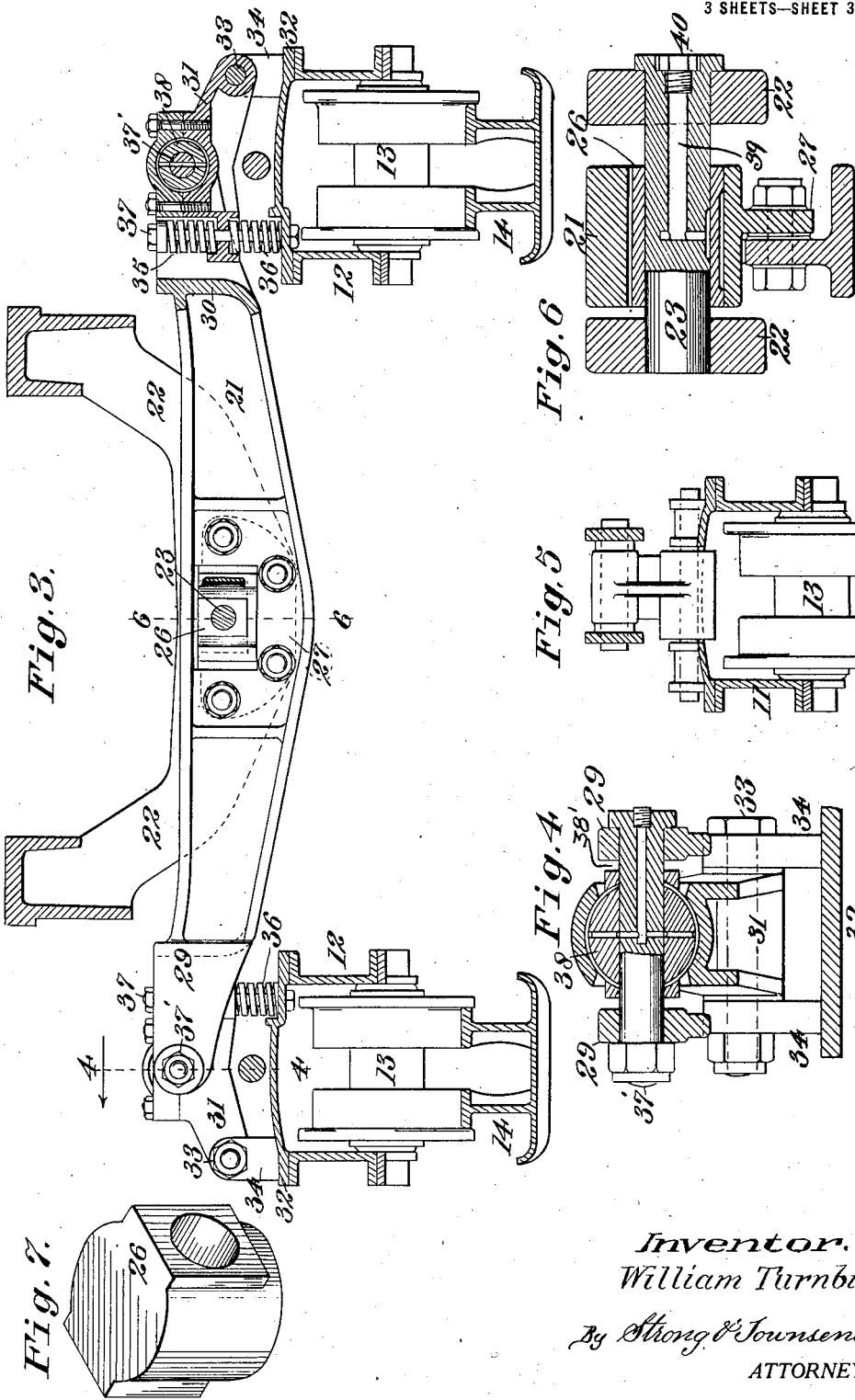

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACTOR-FRAME SUSPENSION.

1,344,363.  Specification of Letters Patent.  Patented June 22, 1920.

Application filed May 25, 1918. Serial No. 236,524.

*To all whom it may concern:*

Be it known that I, WILLIAM TURNBULL, a citizen of the United States, residing at Peoria, in the county of Peoria and State of Illinois, have invented new and useful Improvements in Tractor-Frame Suspensions, of which the following is a specification.

This invention relates to a traction engine of the type disclosed in my co-pending application Serial Number 77,382, filed February 10th, 1916.

In practice the roller trucks of a tractor of the endless chain tread type are subjected to strains and forces which tend to cause them to move in vertical planes and independently of one another and to move a limited distance longitudinally of the tractor.

It is the principal object of this invention to provide a mounting for the trucks of the tractor, whereby the load of the frame will be equally distributed upon the side roller trucks and will at the same time permit the trucks to move at will without disturbing the frame or transmitting undesired twists and strains to it.

In carrying out the present invention, a transversely extending equalizer bar is provided, which is so connected to the frame and to the trucks as to allow for a rocking movement, both in a vertical plane and in a horizontal plane, as well as a limited bodily sliding movement fore and aft or longitudinally of the frame; the opposite outer ends of this equalizer bar being connected with the truck frames in a manner to allow the frames horizontal and vertical pivotal movement in relation to the connections, this movement being resisted by cushion springs along the inner sides of the upper faces of the trucks. In short, the equalizer bar gives the third point of suspension of the frame on the trucks while providing for universal movement of the trucks with respect to the frame.

The invention is illustrated by way of example in the accompanying drawings, in which—

Figure 1 is a view in side elevation, illustrating the completely assembled tractor and particularly disclosing the frame suspension.

Fig. 2 is a view in plan, illustrating the tractor frame and the arrangement of the trucks therebeneath.

Fig. 3 is a view in vertical section and elevation, as seen on the line 3—3 of Fig. 2, and as disclosing the construction of the equalizer bar and its connections to the frame and the trucks.

Fig. 4 is a view in section and elevation, as seen on the line 4—4 of Fig. 3, illustrating the universal connection between the extremities of the equalizer bar and the trucks.

Fig. 5 is a view in section and elevation, as seen on the line 5—5 of Fig. 2, disclosing the suspension means by which the front truck sections are suspended from the frame.

Fig. 6 is an enlarged view in vertical section, as shown on the line 6—6 of Fig. 3, illustrating the universal joint pivot for the equalizer bar and further disclosing the means by which the bar is afforded longitudinal movement in relation to the frame.

Fig. 7 shows a perspective view of the block employed as a pivot for the equalizer bar.

Referring more particularly to the drawings, 10 indicates a tractor frame, here shown as formed of a one-piece casting, though manifestly it may be fabricated from structural shapes, if desired, as is frequently done. This frame is supported at each side upon a pair of articulated truck sections 11—12, which latter have the usual rollers 13 to run on the endless chain tracks 14. These tracks 14 are of standard construction and encircle a rear drive sprocket 15 and the front idler 16; the drive sprocket being journaled on the main frame and the front idler journaled directly on the front truck section 12.

The general construction is indicated in patent #1,184,705, dated May 23rd, 1916, and issued to my assignor, in which the entire weight of the apparatus is supported upon a pair of endless, self-laying tracks, the driving and steering being accomplished through appropriate driving mechanism to the tracks.

17 is a pivot and spacer bar entirely detached from the main frame and extending across therebeneath and forming the hinges for the truck sections; the trucks being further braced against tipping over and getting out of parallelism by means of the arms 18—19 secured to the top of the trucks and loosely embracing the pivot or hinge bar 17 well in toward the center of the machine. The pivotal connection afforded by these arms 18 and 19 and the hinge bar 17 allows each section of each truck to have a free hinge movement in a vertical plane with respect to all the other sections. 19ª represents pivoted push bars to maintain the proper position of the trucks with respect to the rear sprockets. These bars extend from axles of driving wheels forwardly to pivots 19ᵇ on adjacent truck frames.

The load is carried on the trucks through the medium of suitable spring connections 20, at the rear, and an equalizer bar 21, at the front. The rear or spring connections, generally indicated at 20, constitute the subject-matter of a separate application and do not need to be detailed further herein; the present invention having to do more particularly with the construction and arrangement of the equalizer bar 21 and its connections with the frame and trucks.

The equalizer bar 21 is centrally pivoted between a pair of cross members 22 in such a manner that the equalizer bar will have a universal rocking motion both in a horizontal and in a vertical plane; these combined universal sliding and rocking motions of the equalizer bar allowing the latter to accommodate itself to the various movements of the trucks without communicating these motions to the frame. These truck motions which exert themselves on the equalizer bar result from the see-saw action and bending of the trucks under working conditions, particularly when operating over rough ground.

These various results are accomplished as follows: As seen in Fig. 3, the equalizer bar extends between the cross members 22 and overhangs the truck sections 12; the cross members 22 being U-shaped or dropped at their middle so that the swinging outer ends of the equalizer bar will at all times be free of the frame.

The central pivot pin 23, on which the equalizer bar is hung passes through a block 26 which really forms the pivot for the equalizer bar 21. This block is of peculiar configuration, having flat upper and lower faces and curved in the segment of a cylinder on the sides with the pin 23 passing through a diameter of the cylinder; the block being received into a correspondingly shaped recess in the equalizer bar 21, being held in place therein by a removable side plate 27. It will thus be observed that, due to this construction, the equalizer bar will have a rocking motion forward and back in a horizontal plane upon the block 26 and will have a vertical rocking motion upon the pin 23.

In addition to this, as seen particularly in Fig. 6, the width of the central portion of the equalizer bar is considerably less than the space between the cross frame members 22, whereby there is provided a limited bodily fore and aft sliding movement within desired limits of the equalizer bar and its universal block 26 upon the pin 23. This permits the bar to move longitudinally of the frame and in consonance with the limited back and forth or see-sawing actions of the trucks so that the equalizer bar will accommodate itself readily to the shortening or lengthening of the trucks as they bend on their pivots 17 without transmitting any of these jerks or strains to the main frame.

In practice, it is found that this method of suspending the equalizer bar centrally of the main frame eliminates the major portion of the vibrations that are normally transmitted to the frame, due to the irregular movement of the trucks, particularly in their travel over rough or uneven road conditions.

The outer ends of the equalizer bar are formed with U-shaped extensions 29 and 30 which provide a vertical space between them to receive a cantaliver shackle member 31 by which the upper truck plates 32 are directly secured. The shackle members 31 are pivotally connected by bolts 33 to standards 34 extending upwardly from the outer edge of the truck frame plates 32. These shackles extend inwardly over the top of the frame plates and terminate adjacent to the inner edge of these plates. The free end of each shackle is suspended between springs 35 and 36 which are held by a common bolt 37 extending downwardly through them and the truck plate. By this mounting the shackle is free to swing vertically against the opposite expansion of the springs 35 and 36.

The ends of the equalizer bar are directly secured to the shackle by means of a pin 37′ which extends longitudinally of the truck and is disposed along the lateral central axis thereof. These pins extend through swivel blocks 38 which are spherical and are mounted within spherical sockets upon the top of the shackles. Due to this construction the trucks have a swinging movement both vertically and horizontally in relation to the ends of the equalizer bar. As shown in Fig. 4, the space occupied by the swivel block 38 and its socket is of considerably less width than the space between the members 29, so as to permit the block 38 and it socket to have a limited sliding motion lengthwise of the pin 37′; this clearance being represented at 38′. This is an independent movement from the movement provided by the central pivot of the equalizer bar and insures flexibility of movement of the truck sections. This movement, as will be seen, is resisted by the upper and lower springs 35 and 36 which tend to maintain the trucks upon the opposite side of the tractor in vertical alinement. However, due to the individual universal mounting of each truck they may readily adapt themselves to the contour of the road without binding and without placing undue strain upon any of the intermediate connecting parts.

When a truck rocks, there is a displacement of its forward end with respect to the main frame in a fore and aft direction on account of the arcuate path described by this end of the truck. The slidable connection of the equalizer bar on the pins 23 and 37' will permit the necessary fore and aft displacement of the forward ends of the trucks incident to their oscillating movements.

As there is constant movement of the members composing the truck connections and the equalizer bar mounting, it is essential that these parts be adequately lubricated. The equalizer bar mounting is lubricated by forming a grease well 39 along the center of the pivot pin 23 and thereafter producing radial outlets to distribute the grease to an annular channel around the pin. This grease well is closed by means of a screw closure 40 in the end of the pin. Other lubricating channels are formed around the block 26 and insure that the lubricant will be distributed to this bearing surface. The outer pins 37' are formed with similar grease wells which distribute the lubricant to the outer surface of the pins and thereafter register with passages in the block 38 which carry the lubricant to circumferential grooves upon the block.

By the structure here disclosed the weight of the tractor is distributed at three points upon the front and rear truck sections, each point of support being cushioned. While the truck sections are afforded the greatest liberality of movement within practical bounds, yet these movements are not transmitted in the form of twists and strains to the main frame, due to the rigid equalizer bar with its fore and aft and universal swivel movements within desired limits, supplemented by the double-acting springs 35 and 36 which insure a spring cushion at all times between the frame and trucks.

Each truck has a pivot about which it rocks, which, in the present form, is represented by the hinge pin 17, when the action of the forward truck section is considered alone, or pivot 19$^b$, when the united action of both truck sections is considered. This connection is so fixed that it does not permit any fore or aft movement of the trucks bodily.

Having thus described my invention, what I claim and desire to secure by Letters Patent is—

1. In a vehicle, the combination of a frame, a self-laying, flexible, endless track member at each side of the frame, trucks within the track members, and an equalizer bar centrally pivoted to the frame and pivoted at its ends to the trucks, said equalizer bar having a universal pivotal motion on a central pivot and forming a support for one end of the frame, the other end of the frame being supported on the trucks.

2. In a vehicle, the combination of a frame, a self-laying, flexible, endless track member at each side of the frame, trucks within the track members, and an equalizer bar centrally pivoted to the frame and pivoted at its ends to the trucks, said equalizer bar having a universal rocking motion in vertical and horizontal planes and also having a bodily fore and aft motion on its pivot and forming a support for one end of the frame, the other end of the frame being supported on the trucks.

3. In a vehicle, the combination of a frame, a self-laying, flexible, endless track member at each side of the frame, trucks within the frame, yielding load-supporting connections between the rear end of the frame and the trucks, and an equalizer bar at the front end of the frame for supporting the latter on the trucks, said equalizer bar having a single point of connection with the main frame and so constructed and arranged that said equalizer bar has a limited fore and aft sliding motion at its said point of connection.

4. In a vehicle, the combination of a frame, a self-laying, flexible, endless track member at each side of the frame, trucks within the frame, yielding load-supporting connections between the rear end of the frame and the trucks, a rigid equalizer bar at the front end of the frame for supporting the latter on the trucks, said equalizer bar having a single point of connection with the main frame and so constructed and arranged that said equalizer bar has a limited fore and aft sliding motion at its said point of connection, and universal spring connections between the ends of the equalizer bar and the respective truck.

5. In a vehicle, the combination of a main frame and an equalizer bar forming a load support, said equalizer bar having a single point of connection with the main frame and having a rocking motion in a vertical plane and in a horizontal plane.

6. In a vehicle, the combination of a main frame and an equalizer bar forming a load support, said equalizer bar having a single point of connection with the main frame and having a rocking motion in a vertical plane and in a horizontal plane, and also having a limited sliding movement fore and aft of the main frame.

7. In a vehicle, the combination with the main frame, of a rigid equalizer bar extending crosswise of the frame, said frame having dropped substantially U-shaped cross members between which the equalizer bar is pivoted, said cross members being spaced to permit the equalizer bar to slide forward and back on its pivot, said pivot and equalizer bar so constructed and arranged as to provide for pivotal motion in vertical and horizontal planes of the equalizer bar.

8. In a vehicle, the combination of a frame, a self-laying, endless, flexible track member at each side of the frame, articulated truck sections within each truck member, springs between the frame and the rear truck sections, and a cross bar centrally pivoted to the frame for universal rocking motion in vertical and horizontal planes, said cross bar being pivoted at its ends to the front truck sections, whereby the frame is given a three-point bearing on the truck members.

9. In a vehicle, the combination of a frame, a self-laying, endless, flexible track member at each side of the frame, articulated truck sections within each truck member, springs between the frame and the rear truck sections, and a cross bar centrally pivoted to the frame for universal rocking motion in vertical and horizontal planes, said cross bar being spring supported at its ends to the front truck sections, whereby the frame is given a three-point bearing on the truck members.

10. In a vehicle, the combination of a main frame, an endless, flexible track belt on each side of the main frame, a truck within each track belt having rollers bearing on the ground run thereof, a front idler and a rear sprocket around which each track belt travels, and a rigid equalizing bar centrally connected to the main frame, said equalizing bar yieldingly connected at each end to the truck by means of spring-supported shackles, which latter are pivotally connected to the outer edge of a respective truck, the inner ends of the shackles being spring-supported above and below, and the equalizer bar having its pivotal connections with the shackles intermediate of the ends thereof.

11. In a self-laying track vehicle, the combination with the main frame thereof, of an equalizer bar for supporting one end of said frame, trucks for supporting the ends of the equalizer bar, connections between the outer ends of the equalizer bar and the trucks, including shackle members which are pivoted at the outer edge of a truck, and springs for yieldingly supporting the inner end of the shackle, the respective end of the equalizer bar being connected centrally to a horizontally and longitudinally extending pivot.

12. In a vehicle of the self-laying track variety, the combination of a main frame, endless, self-laying tracks, trucks on which the frame is supported, and an equalizer bar pivoted on the frame to have a universal pivotal motion in vertical and horizontal planes, said equalizer bar having a universal pivotal connection with each truck.

13. In a vehicle of the self-laying track variety, the combination of a main frame, endless, self-laying tracks, trucks on which the frame is supported, an equalizer bar pivoted on the frame to have a universal pivotal motion in vertical and horizontal planes, said equalizer bar having a universal pivotal connection with each truck.

14. In a vehicle of the self-laying track variety, the combination of a main frame, endless, self-laying tracks, trucks on which the frame is supported, an equalizer bar pivoted on the frame to have a universal pivotal motion in vertical and horizontal planes, said equalizer bar having a universal pivotal connection with each truck, and spring means combined with said last named universal connections with the trucks for yieldingly supporting the ends of the bar on the trucks.

15. In a vehicle of the self-laying track variety, the combination of a main frame, endless, self-laying tracks, trucks on which the frame is supported, an equalizer bar pivoted on the frame to have a universal pivotal motion in vertical and horizontal planes, said equalizer bar having a universal pivotal connection with each truck, and means by which the bar may have a limited bodily fore and aft motion in connection with its pivotal connections with the main frame.

15. In a vehicle, a main frame, a pair of chain track truck mechanisms each having pivotal connection about which it rocks in a vertical plane, and an equalizing bar between opposite trucks for supporting the main frame at its middle, and connections for the equalizing bar such as to permit the necessary fore and aft displacement of each truck mechanism as the latter moves through the arc of a circle about its rocking point.

16. In a vehicle, a main frame, a pair of chain track trucks, each having pivotal connection about which it rocks in a vertical plane, equalizing means between opposite trucks for supporting the main frame at one end, and connections for the equalizing means permitting necessary fore and aft displacement of the trucks incident to their rocking movement about a fixed pivot.

17. In a chain track vehicle, the combination of a main frame, a pair of chain track truck mechanisms supporting the same, a support for said main frame comprising a load connection at one end of the trucks to permit of oscillatory motion of the trucks with respect to the main frame, an equalizer bar supporting the main frame on the opposite ends of the trucks, said equalizer bar having universal movement with respect to the main frame, and hinge connections between the ends of the equalizer bar and the trucks also having universal movement.

18. In a chain track vehicle, the combination of a main frame, a pair of chain track truck mechanisms supporting the same, a support for said main frame comprising a load connection at one end of the trucks to permit of oscillatory motion of the trucks with respect to the main frame, an equalizer bar supporting the main frame on the opposite ends of the trucks, said equalizer bar having universal movement with respect to the main frame, and hinge connections between the ends of the equalizer bar and the trucks also having universal movement, said hinge connections between the equalizer bar and the trucks including means permitting relative sliding motion of the equalizer bar and trucks.

In testimony whereof I have hereunto set my hand in the presence of two subscribing witnesses.

WILLIAM TURNBULL.

Witnesses:
　EMIL F. NORELIUS,
　H. B. BAKER.